US006809919B2

United States Patent
Naito et al.

(10) Patent No.: US 6,809,919 B2
(45) Date of Patent: *Oct. 26, 2004

(54) CAPACITOR

(75) Inventors: Kazumi Naito, Chiba (JP); Katsutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/365,446

(22) Filed: Feb. 13, 2003

(65) Prior Publication Data

US 2003/0179538 A1 Sep. 25, 2003

Related U.S. Application Data

(63) Continuation of application No. 09/722,677, filed on Nov. 28, 2000, now Pat. No. 6,545,858.
(60) Provisional application No. 60/240,832, filed on Oct. 17, 2000.

(30) Foreign Application Priority Data

Nov. 30, 1999 (JP) .......................................... 11-339296

(51) Int. Cl.$^7$ ................................................ H01G 9/04
(52) U.S. Cl. ...................... 361/510; 361/511; 361/512; 361/516; 361/519; 361/523; 361/307

(58) Field of Search .................................. 361/510, 511, 361/512, 516, 519, 520, 523, 508, 509, 502, 503, 307, 308.1

(56) References Cited

U.S. PATENT DOCUMENTS

| | | | |
|---|---|---|---|
| 6,051,044 A | 4/2000 | Fife | |
| 6,166,899 A | 12/2000 | Tamamitsu | |
| 6,338,816 B1 | 5/2002 | Fife | |
| 6,545,858 B1 * | 4/2003 | Naito et al. | ................. 361/510 |

* cited by examiner

Primary Examiner—Dean A. Reichard
Assistant Examiner—Nguyen T. Ha
(74) Attorney, Agent, or Firm—Sughrue Mion, PLLC

(57) ABSTRACT

An electrode for a capacitor including a sintered body of a powder of a valve action metal or its alloy and wherein a lead wire connected to the sintered body made of partially nitrided niobium is disclosed. A molded compact including a molded powder of a valve action metal or alloy thereof and a lead wire made of partially nitrided niobium is also disclosed. Use of a partially nitrided niobium as a material of the lead wire provides a capacitor having high withstand voltage and being light weight without a decrease in capacitance.

15 Claims, 1 Drawing Sheet

CAPACITOR

CROSS-REFERENCE TO RELATED APPLICATIONS

This is a continuation of application Ser. No. 09/722,677 filed Nov. 28, 2000, now U.S. Pat. No. 6,545,858 B1, which claims benefit from Provisional Application No. 60/240,832 filed Oct. 17, 2000; the disclosures of which are incorporated herein by reference.

TECHNICAL FIELD

The present invention relates to a capacitor using partially nitrided niobium as a lead wire material for electrodes.

BACKGROUND ART

Two electrodes and a dielectric material interposed therebetween constitute conventional capacitors. As one of such electrodes, there is used, for example, one selected from valve action metals such as tantalum, aluminum, niobium, titanium and alloys of these metals. To the electrode is connected one end of a lead wire for electrical connection with the outside. As for the material of lead wires, generally thin wires of tantalum and aluminum have been used.

In capacitors with armors in the form of final commercial products, one end of the lead wire is connected to the above-described one end of the electrode by, for example, welding, caulking, sintering after simultaneous molding or the like. The other end of the lead wire that is not connected to the electrode may be of the construction such that it is electrically connected, in the inside of the armor, to one end of an outer terminal separately provided for electrical connection from the inside of the armor to the outside. That is, it may be of the construction such that it is connected to a portion between the above-described one electrode and the outer terminal.

Further, for the above-described capacitors, those used in the inside of a recent electronic device are desired to be reduced in size, light in weight and have a large capacitance. On the other hand, there is formed also on a surface of a part of the lead wire connected to the above electrode, an oxide of the material of a takeout wire as a part of a dielectric layer provided between the electrodes. Since the connection parts between the electrodes and lead wires are of the structure that is unstable in stress, the dielectric layer formed near the connection parts containing a part of the lead wire is unstable in structure and stress. This is improved by increasing the thickness of the dielectric layer formed on the surfaces of a part of the lead wire and the electrode to which the lead wire is connected. However, the capacitors produced by this method usually tend to have a reduced capacitance, thus failing to meet to the requirement of large capacitance. This is because the thickness of the dielectric is increased. However, in the case where a lead wire composed of a niobium material is used, an increased capacitance is met if the thickness of the dielectric layer (niobium oxide) near the connection part of the lead wire is increased in order to avoid instability in structure and stress. This is because the niobium oxide has a large dielectric constant. Furthermore, since niobium is lighter in weight than tantalum, reduction in weight can be met simultaneously. However, the withstand voltage of capacitors produced using lead wires made of a niobium material is lower than that of conventional capacitors produced using lead wires made of tantalum and is unsatisfactory.

DISCLOSURE OF THE INVENTION

Accordingly, an object of the present invention is to provide a light capacitor having high withstand voltage using a lead wire made of niobium as a material without decreasing its capacitance.

Under the circumstances, the present inventors have made intensive research and as a result developed a lead wire made of a niobium material having a high withstand voltage with preventing a decrease in capacitance, thus achieving the present invention.

That is, the present invention has solved the above problems by proving the capacitors described in 1 to 5 below.

1. A capacitor comprising two electrodes and a dielectric interposed therebetween, wherein at least one of the electrodes is made of a valve action metal or its alloy and wherein a lead wire connected to the at least one electrode is made of partially nitrided niobium.
2. The capacitor as described in 1 above, wherein the partially nitrided niobium as the material of the lead wire has a nitrogen content of 10 to 150,000 mass ppm.
3. The capacitor as described in 2 above, wherein the partially nitrided niobium as the material of the lead wire has a nitrogen content of 100 to 100,000 mass ppm.
4. The capacitor as described in 3 above, wherein the partially nitrided niobium as the material of the lead wire has a nitrogen content of 500 to 7,000 mass ppm.
5. The capacitor as described in 1 above, wherein the electrode to which the partially nitrided lead wire is connected is made of at least one selected from the group consisting of tantalum, tantalum alloy, niobium and niobium alloy.
6. The capacitor as described in 1 above, wherein the electrode to which the partially nitrided lead wire is connected is made of at least one selected from the group consisting of tantalum, tantalum alloy, niobium and niobium alloy and is partially nitrided.
7. The capacitor as described in any of 1 to 4 above, wherein the electrode to which the partially nitrided lead wire is connected is of the structure obtained by integrally molding and sintering a partially nitrided niobium powder and powder of an electrode material and has a CV value of at least 50,000 (CV/g).

The reason why the capacitor of the present invention using a partially nitrided niobium as the material of the lead wire prevents the deterioration of withstand voltage has not been made clear but may be presumed as follows.

The above-described dielectric layer formed between the electrodes is formed also on a part of the lead wire connected to the electrode. However, if niobium is used as the material of lead wire, niobium tends to extract oxygen contained in the dielectric layer formed on the lead wire since niobium has higher affinity for oxygen than tantalum does. Therefore, the insulation of the dielectric layer formed near the connection part that includes a part of the lead wire decreases and as a result the withstand voltage decreases. It is considered that in the present invention, however, the niobium as the material of the lead wire is partially nitrided niobium, in which niobium is bonded to nitrogen so that the tendency that oxygen is extracted from the dielectric layer is alleviated to prevent the deterioration of the withstand voltage of a finally produced capacitor.

EMBODIMENTS FOR CARRYING OUT THE INVENTION

Figure 1:
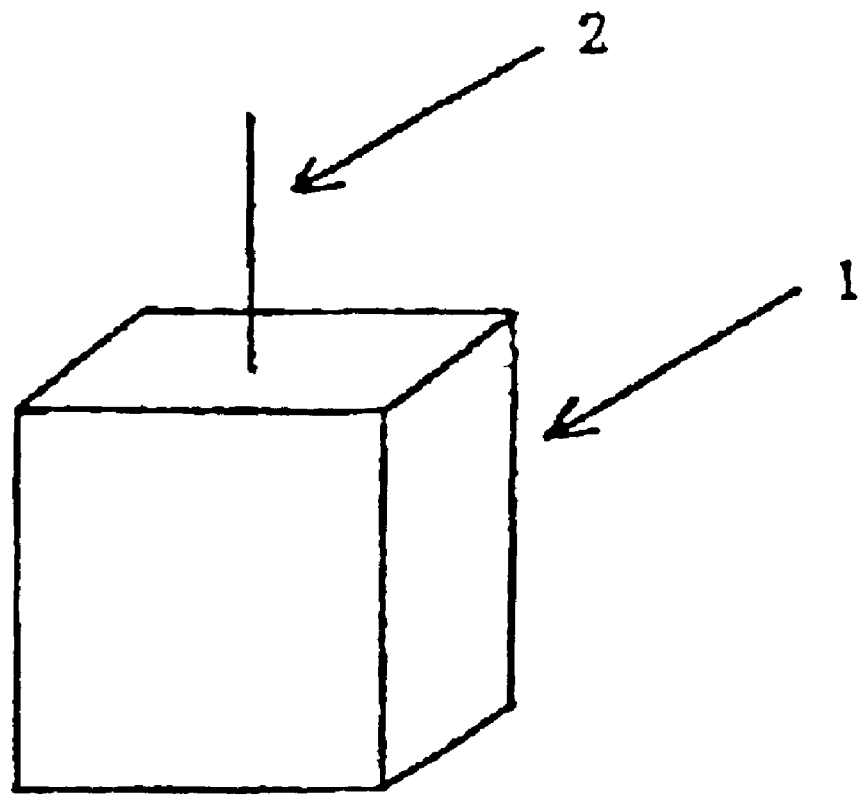
FIG. 1 is a schematic diagram showing an embodiment of one electrode (1) of a capacitor having a lead wire (2) made of partially nitrided niobium in accordance with the present invention.

An embodiment for obtaining a capacitor of the present invention will be described below.

As the material for one electrode used in the present invention, there may be used one selected from valve action metals such as tantalum, niobium and aluminum and alloys containing these metals as main components. The shape of electrode may be plate, foil, rod, sintered body, or the like. Its size may be determined freely taking into consideration of the capacitance of the capacitor to be produced. In the case of foil or rod electrode, it may be folded or wound or its surface may be etched to increase surface area per unit volume before it can be used. In the case where a sintered body is produced, there may be used, for example, a method in which powder of the above-described material is molded under pressure and then left to stand under the conditions of ($10^0$ to $10^{-6}$)×133 Pa and 500 to 2,000° C. for from several minutes to several hours.

The partially nitrided niobium used as a lead wire in the present invention may be plate, foil or rod in shape and generally smaller in size than the above-described electrode. The connection between one end of the lead wire and the electrode may be achieved by a method of electrically connecting them by welding, use of conductive paste, caulking, pressing or the like. In the case where the electrode is made of a sintered body, the sintered body of electrode and the lead wire may be electrically connected, for example, by inserting a part of the lead wire when pressure molding metal powder and then sintering them together. The number of lead wire to be connected to each electrode may be one or more.

The lead wire of partially nitrided niobium in accordance with the present invention can be obtained, for example, by nitriding a lead wire of niobium in a nitrogen gas atmosphere. In this case, the nitrogen content is preferably 10 to 150,000 mass ppm. From the viewpoint of decreasing leakage current of the dielectric comprised of niobium oxide, 100 to 10,000 mass ppm is more preferred and 500 to 7,000 mass ppm is particularly preferred. Nitridation may be performed by other nitriding methods, including liquid nitridation, ion nitridation, or gas nitridation or combinations thereof. The gas nitridation treatment with a nitrogen gas atmosphere is preferred since the apparatus is simple and easy to operate.

A partially nitrided niobium lead wire having a desired nitrogen content can be obtained at a nitridation temperature of 2,000° C. or less and for a nitridation time of within several tens hours. Generally, a higher temperature can give rise to lead wires of predetermined nitrogen contents in a shorter time. Even at room temperature, leaving niobium to stand in a nitrogen atmosphere for several tens hours can provide partially nitrided lead wires having a nitrogen content of several tens mass ppm.

Another method of obtaining partially nitrided niobium lead wires of the present invention is to fabricate a long and/or wide, partially nitrided niobium lead wire precursor and cut it to appropriate length and/or size when connecting to the above-described electrode or in the case where the electrode is made of a sintered body, for example, when inserting the lead wire before pressure molding metal powder for forming the electrode.

Alternatively, the electrode used in the present invention may be made a partially nitrided electrode in advance and a lead wire made of the above-described partially nitrided niobium may be connected thereto. An example of the method for fabricating a partially nitrided electrode includes the above-described nitridation treatment method used when partially nitriding the niobium lead wires. Nitridation may be performed by other nitriding methods, including liquid nitridation, ion nitridation, or gas nitridation or combinations thereof. Here, too, the gas nitridation treatment with a nitrogen gas atmosphere is preferred since the apparatus is simple and easy to operate.

As the dielectric for the above-described capacitor, for example, tantalum oxide, aluminum oxide, titanium oxide, polymers such as polyparaxylene, ceramic compounds such as barium titanate may be used.

In the case where tantalum oxide is used as the dielectric, tantalum oxide may be formed by converting tantalum or tantalum alloy or partially nitrided tantalum or tantalum alloy as one electrode in an electrolyte or applying a complex containing tantalum, for example, alkoxy complex, acetylacetonate complex or the like to the electrode and then hydrolyzing and/or heat decomposing it.

In the case where niobium oxide is used as the dielectric, niobium oxide may be formed by converting niobium or niobium alloy or partially nitrided niobium or niobium alloy as one electrode in an electrolyte or applying a complex containing niobium, for example, alkoxy complex, acetylacetonate complex or the like to the electrode and then hydrolyzing and/or heat decomposing it.

In the case where aluminum oxide is used as the dielectric, aluminum oxide may be formed by converting aluminum or aluminum alloy or partially nitrided aluminum or aluminum alloy as one electrode in an electrolyte.

In the case where titanium oxide is used as the dielectric, titanium oxide may be formed by converting titanium or titanium alloy or partially nitrided titanium or titanium alloy as one electrode in an electrolyte.

Of the above-described methods for making the dielectric, in the case where the dielectric is obtained by conversion in an electrolyte, the capacitor of the present invention becomes an electrolytic capacitor and the converted electrode side serves as an anode. In the case where it is obtained by decomposing a complex, the electrode to which the complex is applied theoretically has no polarity and may be used either as an anode or a cathode.

As the method of forming the dielectric from a polymer or a ceramic compound, the methods described in Published Examined Japanese Patent Application No. Hei 7-63045 and Published Examined Japanese Patent Application No. Hei 7-85461. A film of a polymer or a film of a ceramic compound can be formed, for example, by reaction on one electrode.

Among the dielectric layers and methods of forming dielectric layers, the method of converting an electrode made of tantalum or tantalum alloy or partially nitrided tantalum or tantalum alloy in an electrolyte to form tantalum oxide as a dielectric on the electrode or the method of converting an electrode made of niobium or niobium alloy or partially nitrided niobium or niobium alloy in an electrolyte to form niobium oxide as a dielectric on the electrode is preferable since it has good workability and the fabricated capacitor has a large capacitance. Use of nitrided material is preferable since the capacitor has a small leakage current and good reliability.

Furthermore, in the case where the structure of the electrode is of a sintered body, it is preferred to fabricate a sintered body using powder of tantalum or tantalum alloy or partially nitrided powder thereof so as to have a CV value (a value obtained by dividing the product of capacitance and voltage applied during electrolytic oxidation by the weight of electrode) of at least 50,000 (CV/g) in order to obtain a capacitor having a large capacitance. For example, use of powder having an average particle diameter of 0.6 to 1 $\mu$m makes it possible to obtain such a CV value. Moreover, by decreasing the average particle diameter of the powder for making the sintered body, a greater CV value can be obtained. A sintered body having a greater CV value required for obtaining a capacitor having a higher capacitance can be made by setting the average particle diameter to, for example, 0.2 to 0.5 μm in order to obtain 60,000 to 140,000 (CV/g), more particularly, for example, 0.2 μm or less in order to further obtain 150,000 (CV/g) or more.

Furthermore, in the case where the structure of the electrode is of a sintered body, it is preferred to fabricate a sintered body using powder of niobium or niobium alloy or partially nitrided powder thereof so as to have a CV value (a value obtained by dividing the product of capacitance and voltage applied during electrolytic oxidation by the weight of electrode) of at least 50,000 (CV/g) in order to obtain a capacitor having a large capacitance. For example, use of powder having an average particle diameter of 3 to 5 μm makes it possible to obtain such a CV value. Moreover, by decreasing the average particle diameter of the powder for making the sintered body, a greater CV value can be obtained. A sintered body having a greater CV value required for obtaining a capacitor having a higher capacitance can be made by setting the average particle diameter to, for example, 0.3 to 2 μm in order to obtain 100,000 (CV/g) or more, more particularly, for example, 0.2 μm or less in order to further obtain 600,000 (CV/g) or more. The tantalum powder having such an average particle diameter can be obtained, for example, by the method of reducing potassium fluorotanatalate with sodium, the method of pulverizing and dehydrogenating hydride of tantalum ingot, the method of reducing tantalum chloride with carbon or a metal, or the like. For example, in the case where the tantalum powder is obtained by the method of reducing potassium fluorotantalate with sodium, tantalum powder having a desired average particle diameter can be obtained by adjusting the concentration of starting material and the concentration of sodium salt used as a catalyst.

The niobium powder having such an average particle diameter can be obtained, for example, by the method of pulverizing a reduction product of potassium fluoroniobate with sodium, the method of pulverizing and dehydrogenating a hydride of niobium ingot, by the method of reducing niobium oxide with carbon or the like. For example, in the case where the niobium powder is obtained by the method of pulverizing and dehydrogenating a hydride of niobium ingot, niobium powder having a desired average particle diameter can be obtained by adjusting the amount of hydration and time of pulverization of the niobium ingot, pulverization apparatus, etc.

In the case where a part of the powder for forming a capacitor has been nitrided in advance, the nitrogen content of the powder is from several hundreds mass ppm to several tens thousands mass ppm, preferably from 500 mass ppm to 7,000 mass ppm. If the nitrogen content is within this range, a capacitor can be obtained which has a further improved leakage current value (LC value) without decreasing the capacitance of the capacitor fabricated from a sintered body of the powder for making capacitors.

Here, the nitrogen content of the powder for capacitors such as tantalum or niobium powder is not one measured in the state where nitrogen is adsorbed on such a material but in the sate where nitrogen is really bonded to nitride the material.

The partially nitrided electrode can be obtained by using the method of nitriding a sintered body after its fabrication.

For example, after molding and sintering niobium powder, the sintered body can be nitrided using the above-described nitridation treatment method. In this case, the lead wire connected to the electrode can be nitrided together so that the process can be simplified.

The other electrode of the capacitor of the present invention is not particularly limited and it can be made of, for example, at least one compound selected from electrolytes, organic semiconductors and inorganic semiconductors known in the field of aluminum electrolytic capacitors.

Specific examples of the electrolyte include a mixed solution of dimethylformamide and ethylene glycol having dissolved therein 5% by weight of isobutyltripropylammonium borotetrafluoride electrolyte, a mixed solution of propylene carbonate and ethylene glycol having dissolved therein 7% by weight of tetraethylammonium borotetrafluoride, and the like.

Specific examples of the organic semiconductor include an organic semiconductor composed of a benzopyrroline tetramer and chloranil, an organic semiconductor comprising tetrathiotetracene as a main component, an organic semiconductor comprising tetracyanoquinodimethane as a main component, and organic semiconductors comprising conductive polymers comprised of a polymer represented by the general formula (1) or (2) below, doped with a dopant as a main component.

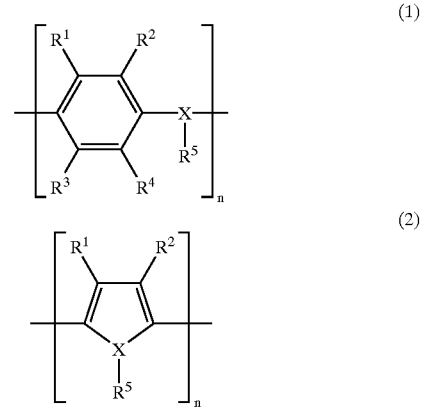

In the formulae (1) and (2) above, $R^1$ to $R^4$, which may be the same or different, represent each hydrogen, an alkyl group having 1 to 6 carbon atoms or an alkoxy group having 1 to 6 carbon atoms, X represents an oxygen, sulfur or nitrogen atom, $R^5$, which exists only when X is a nitrogen atom, represents hydrogen or an alkyl group having 1 to 6 carbon atoms, and $R^1$ and $R^2$ or $R^3$ and $R^4$ may combine together to form a ring. The polymers represented by the formula (1) or (2) include, for example, polyaniline, polyoxyphenylene, poly(phenylene sulfide), polythiophene, polyfuran, polypyrrole, polymethylpyrrole, and derivatives of these polymers and the like.

Specific examples of the inorganic semiconductor include an inorganic semiconductor containing lead dioxide or manganese dioxide as a main component, an inorganic semiconductor composed of tri-iron tetroxide, and the like. Such semiconductors may be used alone or two or more of them may be used in combination.

When organic and inorganic semiconductors having conductivities within the ranges of from $10^{-2}$ S·cm$^{-1}$ to $10^3$ S·cm$^{-1}$ are used as the above-mentioned organic and inorganic semiconductors, respectively, the fabricated capacitor has a decreased impedance and a greater capacitance at high frequencies.

Next, in the case where the above-described other electrode is made of a solid, a capacitor can be constituted by sequentially superposing a carbon paste layer and a silver paste layer on the other electrode, connecting an end of the lead wire onto the silver paste layer and the other end of the lead wire to an external terminal provided for the other electrode, and sealing with a material such as epoxy resin. In this case, for electrical connection from the inside of the epoxy resin to the outside, the other end of the partially nitrided niobium lead wire (whose one end is connected to one electrode) may be of such a structure, for example, that it is electrically connected to an end of the external terminal provided for the partially nitrided niobium lead wire inside the armor. That is, the state may be established where a partially nitrided niobium lead wire connects between the above-described one electrode and the external terminal.

When the other electrode is made of a liquid, the capacitor of the present invention may be constituted by holding the above-described capacitor composed of the electrodes and dielectric in a can which is electrically connected to the other electrode (and to which an end of the external terminal for the other electrode is connected, if needed). In this case, the side of the electrode to which one end of the lead wire composed of partially nitrided niobium is connected is of such a design that the partially nitrided niobium lead wire is led to the outside of the can and at the same time the partially nitrided niobium lead wire is electrically insulated from the other electrode and the can, for example, using insulating rubber or the like. Alternatively, the side of the electrode may be of such a design that the partially nitrided niobium lead wire connected to the electrode, after being cut at an appropriate position, is connected to one end of the external terminal provided for the partially nitrided niobium lead wire and the external terminal is led out to the outside.

The other ends of respective lead wire that are not connected to the electrodes may be directly led out of the armor without using respective external terminals. Alternatively, an outer terminal may be directly connected to the other electrode without using any lead wire.

In an electrolytic capacitor in which aluminum or aluminum alloy is formed into a foil-like electrode, a partially nitrided niobium lead wire may be used as the lead wire connected to at least one of the electrodes.

As described above, the capacitor of the present invention produced by using a partially nitrided niobium lead wire has good withstand voltage without decreasing the capacitance, a leakage current suppressed to a low level and good reliability.

BEST MODE FOR CARRYING OUT THE INVENTION

Hereinafter, the present invention will be described specifically by way of examples and comparative examples. However, the following examples should not be construed as limiting the present invention.

In the following examples, nitridation amounts of powder and lead wire, capacitance of sintered body, leakage current (LC value) of sintered body, capacitance and leakage current of capacitor were measured as follows.

(1) Nitridation Amounts of Powder and Niobium Lead Wire

Using an oxygen/nitrogen amount measuring apparatus produced by LECO Corp., which apparatus obtains nitrogen amount from thermal conductivity, the nitrogen amounts of powder and niobium lead wire were obtained and their ratios to the mass of the powder separately measured were defined as nitrogen amounts.

(2) Capacitance of Sintered Body

At room temperature an LCR measuring apparatus produced by HP (Hewlett Packard) is connected between a sintered body dipped in a 30% sulfuric acid solution and an electrode made of tantalum placed in a sulfuric acid solution and capacitance at 120 Hz was measured. This was defined as the capacitance of sintered body.

(3) Leakage Current (LC Value) of Sintered Body

At room temperature, direct current voltage corresponding to 70% of the conversion voltage used at the time of making a dielectric was applied for 3 minutes between a sintered body dipped in a 20% phosphoric acid solution and an electrode in a phosphoric acid solution and the current measured was defined as leakage current of the sintered body. In the present invention, a voltage of 14 V was applied.

(4) Capacitance of Capacitor

At room temperature, an LCR measuring apparatus produced by HP was connected between the terminals of a fabricated chip and capacitance at 120 Hz was measured. This was defined as the capacitance of a capacitor processed into a chip.

(5) Leakage Current of Capacitor

Among rated voltages (2.5 V, 4 V, 6.3 V, 10 V, 16 V, 25 V, etc.), direct current voltage (6.3 V) close to about ⅓ to about ¼ time the conversion voltage at the time of fabricating a dielectric was applied for 1 minutes between the terminals of a fabricated chip at room temperature and the current was measured. This was defined as the leakage current of a capacitor processed into a chip.

EXAMPLES 1 TO 6 AND COMPARATIVE EXAMPLES 1 TO 4

Several niobium thin wires of 0.25 mm φ in thickness and 10 mm in length were provided and a part of niobium in each niobium thin wire was nitrided under the respective conditions in Examples 1 to 6 as shown in Table 1 to fabricate partially nitrided niobium lead wires. Niobium thin wires without nitridation treatments were provided as comparative examples (Comparative Examples 1 to 4). On the other hand, separately tantalum powder (average particle diameter: 0.7 μm) and niobium powder composed of partially nitrided niobium (average particle diameter of 1 μm, obtained by leaving niobium powder in a nitrogen atmosphere under the condition of 300° C. for 2 hours; amount of bound nitrogen being 2,000 mass ppm) were provided. In the electrode species of examples and comparative examples shown in Table 1, 0.14 g (Examples 1 to 3 and Comparative Examples 1 and 2) was weighed for the tantalum powder, and 0.09 g (Examples 4 to 6 and Comparative Examples 3 and 4) was weighed for the niobium powder composed of partially nitrided niobium. Each powder was molded together with the above-described partially nitrided niobium lead wire or non-nitridation-treated lead wire to fabricate a molded compact having a size of 3.5×1.8×4.1 mm (with the above-described lead wire being embedded in the molded compact to a depth of about 2 mm). Thereafter, each molded compact was sintered at a temperature shown in Table 1. Each sintered body to which a partially nitrided niobium lead wire thus obtained was connected was dipped in an aqueous 0.1% phosphoric acid solution together with a part of the lead wire on the side thereof where it was connected to the sintered body. In this state, using the sintered bodies as anodes and a platinum foil as a counter electrode, conversion was performed for 200 minutes under the condition of 80° C. with applying 20 V as a conversion voltage to form a dielectric oxide film layer on the surfaces of the dipped sintered body and a part of the dipped lead wire. The capacitance of each sintered body thus obtained is shown in Table 2. The values in Table 2 were an average of ten samples.

TABLE 1

|  | Nitridation Conditions | Nitridation Amount [mass ppm] | Electrode Species and Sintering Temperature [° C.] |
|---|---|---|---|
| Example 1 | Left in a nitrogen atmosphere at 800° C. for 3 hours, | 3,500 | Tantalum 1,400 |
| Example 2 | Left in a nitrogen atmosphere at 500° C. for 3 hours, | 2,500 | Tantalum 1,400 |
| Example 3 | Left in a nitrogen atmosphere at 400° C. for 3 hours, | 1,600 | Tantalum 1,400 |
| Comparative Example 1 | None | 0 | Tantalum 1,400 |
| Comparative Example 2 | None | 0 | Tantalum 1,600 |
| Example 4 | Left in a nitrogen atmosphere at 800° C. for 3 hours, | 3,500 | Partially nitrided niobium 1,100 |
| Example 5 | Left in a nitrogen atmosphere at 500° C. for 3 hours, | 2,500 | Partially nitrided niobium 1,100 |
| Example 6 | Left in a nitrogen atmosphere at 400° C. for 3 hours, | 1,600 | Partially nitrided niobium 1,100 |
| Comparative Example 3 | None | 0 | Partially nitrided niobium 1,100 |
| Comparative Example 4 | None | 0 | Partially nitrided niobium 1,300 |

TABLE 2

|  | Capacitance [μF] | LC Value [μA] |
|---|---|---|
| Example 1 | 340 | 8 |
| Example 2 | 340 | 8 |
| Example 3 | 340 | 8 |
| Comparative Example 1 | 340 | 11 |
| Comparative Example 2 | 180 | 8 |
| Example 4 | 480 | 9 |
| Example 5 | 480 | 9 |
| Example 6 | 480 | 9 |
| Comparative Example 3 | 480 | 14 |
| Comparative Example 4 | 240 | 9 |

EXAMPLES 7 TO 12 AND COMPARATIVE EXAMPLES 5 TO 8

Thirty samples each of sintered bodies obtained in the same manner as in Examples 1 to 6 and Comparative Examples 1 to 4 were provided. They were dipped and a dielectric oxide film layer was formed on surfaces of each dipped sintered body and of a part of each dipped lead wire in the same manner as in Examples 1 to 6 and Comparative Examples 1 to 4 except that the conversion time was changed to 500 minutes. Then, as the other electrode of the capacitor, a polypyrrole layer was formed on a surface of each dielectric oxide film layer. The products were named Examples 7 to 12 and Comparative Examples 5 to 8, respectively. Then, a carbon paste layer and a silver paste layer were sequentially laminated on the other electrode of each sample. Further, a part of the other electrode was connected to an external terminal (lead frame) separately provided for the other electrode with silver paste. The partially nitrided niobium lead wire was cut at an appropriate position and connected by welding to an end of an external terminal provided for the partially nitrided niobium lead wire. Thereafter, the portion of each external terminal other than the side of the other end of each external terminal (the side not connected) together with the electrode, dielectric and lead wire was sealed with epoxy resin to fabricate a capacitor. The capacitance and withstand voltage of the fabricated capacitors are shown in Table 3.

TABLE 3

|  | Capacitance [μF] | Withstand voltage [V] |
|---|---|---|
| Example 7 | 290 | 19 |
| Example 8 | 290 | 19 |
| Example 9 | 290 | 19 |
| Comparative Example 5 | 290 | 13 |
| Comparative Example 6 | 140 | 19 |
| Example 10 | 420 | 18 |
| Example 11 | 420 | 18 |
| Example 12 | 420 | 18 |
| Comparative Example 7 | 420 | 11 |
| Comparative Example 8 | 210 | 18 |

EXAMPLES 13 TO 18 AND COMPARATIVE EXAMPLES 9 TO 12

For thirty samples each of sintered bodies obtained in the same manner as in Examples 1 to 6 and Comparative Examples 1 to 4, a dielectric oxide film layer was formed on surfaces of each dipped sintered body and of a part of each dipped lead wire in the same manner as in Examples 7 to 12 and Comparative Examples 5 to 8. Then, as the other electrode of the capacitor, a manganese dioxide layer was formed on a surface of each dielectric oxide film layer. The products were named Examples 13 to 18 and Comparative Examples 9 to 12, respectively. Then, a carbon paste layer and a silver paste layer were sequentially laminated on the other electrode of each sample. Further, a part of the other electrode was connected to an external terminal (lead frame) separately provided for the other electrode with silver paste. The partially nitrided niobium lead wire was cut at an appropriate position and connected by welding to an end of an external terminal provided for the partially nitrided niobium lead wire. Thereafter, the portion of each external terminal other than the side of the other end of each external terminal (the side not connected) together with the electrode, dielectric and lead wire was sealed with epoxy resin to fabricate a capacitor. The capacitance and withstand voltage of the fabricated capacitors are shown in Table 4.

TABLE 4

|  | Capacitance [μF] | Withstand voltage [V] |
|---|---|---|
| Example 13 | 295 | 18 |
| Example 14 | 295 | 18 |
| Example 15 | 295 | 18 |
| Comparative Example 9 | 295 | 12 |
| Comparative Example 10 | 160 | 18 |
| Example 16 | 435 | 17 |
| Example 17 | 435 | 17 |
| Example 18 | 435 | 17 |

TABLE 4-continued

|  | Capacitance [μF] | Withstand voltage [V] |
|---|---|---|
| Comparative Example 11 | 435 | 10 |
| Comparative Example 12 | 220 | 17 |

Comparisons of Examples 7 to 9 with Comparative Examples 5 and 6, of Examples 10 to 12 with Comparative Examples 7 and 8 in Table 3, and Examples 13 to 15 with Comparative Examples 9 and 10 and of Examples 16 to 18 with Comparative Examples 11 and 12 in Table 4 revealed that capacitors using a partially nitrided niobium as a lead wire had a high withstand voltage without any decrease in capacitance as compared with conventional capacitors using niobium as a lead wire.

INDUSTRIAL APPLICABILITY

As described above, capacitors of the present invention using a partially nitrided niobium as the material of a lead wire are capacitors lighter in weight and higher in withstand voltage. According to the present invention, capacitors having high withstand voltage and higher capacitance can be obtained.

What is claimed is:

1. An electrode for a capacitor, said electrode comprising a sintered body of a powder of a valve action metal or alloy thereof and a lead wire made of partially nitrided niobium connected to said sintered body.

2. The electrode for a capacitor as claimed in claim 1, wherein the partially nitrided niobium as the material of the lead wire has a nitrogen content of 10 to 150,000 mass ppm.

3. The electrode for a capacitor as claimed in claim 1, wherein the partially nitrided niobium as the material of the lead wire has a nitrogen content of 100 to 100,000 mass ppm.

4. The electrode for a capacitor as claimed in claim 1, wherein partially nitrided niobium as the material of the lead wire has a nitrogen content of 500 to 7,000 mass ppm.

5. The electrode for a capacitor as claimed in claim 1, wherein the sintered body is made of at least one selected from the group consisting of tantalum, tantalum alloy, niobium and niobium alloy.

6. The electrode for a capacitor as claimed in claim 1, wherein the sintered body is made of at least one selected from the group consisting of tantalum, tantalum alloy, niobium and niobium alloy and is partially nitrided.

7. The electrode for a capacitor as claimed in claim 1, wherein the sintered body has a CV value of at least 50,000 (CV/g).

8. The electrode for a capacitor as claimed in claim 1, wherein the sintered body has a CV value of at least 60,000 (CV/g).

9. The electrode for a capacitor as claimed in claim 1, wherein the sintered body has a CV value of at least 150,000 (CV/g).

10. A molded compact comprising a molded powder of a valve action metal or alloy thereof and a lead wire made of partially nitrided niobium.

11. The molded compact as claimed in claim 10, wherein the partially nitrided niobium as the material of the lead wire has a nitrogen content of 10 to 150,000 mass ppm.

12. The molded compact as claimed in claim 10, wherein the partially nitrided niobium as the material of the lead wire has a nitrogen content of 100 to 100,000 mass ppm.

13. The molded compact as claimed in claim 10, wherein the partially nitrided niobium as the material of the lead wire has a nitrogen content of 500 to 7,000 mass ppm.

14. The molded compact as claimed in claim 10, wherein the molded compact is made of at least one selected from the group consisting of tantalum, tantalum alloy, niobium and niobium alloy.

15. The molded compact as claimed in claim 10, wherein the sintered body is made of at least one selected from the group consisting of tantalum, tantalum alloy, niobium and niobium alloy and is partially nitrided.

* * * * *